(12) United States Patent
Liu

(10) Patent No.: US 8,432,686 B2
(45) Date of Patent: Apr. 30, 2013

(54) COMPUTER ENCLOSURE

(75) Inventor: Lei Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 276 days.

(21) Appl. No.: 12/960,347

(22) Filed: Dec. 3, 2010

(65) Prior Publication Data

US 2012/0106075 A1  May 3, 2012

(30) Foreign Application Priority Data

Oct. 28, 2010  (CN) .......................... 2010 1 0523232

(51) Int. Cl.
  *H05K 7/20*  (2006.01)
  *H05K 7/00*  (2006.01)
  *H05K 5/00*  (2006.01)

(52) U.S. Cl.
  USPC ................. 361/679.54; 361/679.49; 361/690; 361/695; 361/704

(58) Field of Classification Search .................. None
  See application file for complete search history.

(56) References Cited

U.S. PATENT DOCUMENTS

| | | | | |
|---|---|---|---|---|
| 5,691,883 | A * | 11/1997 | Nelson | 361/697 |
| 6,545,866 | B2 * | 4/2003 | Katsui et al. | 361/690 |
| 7,573,712 | B2 * | 8/2009 | Wu et al. | 361/695 |
| 8,068,341 | B2 * | 11/2011 | Zhang et al. | 361/695 |
| 8,081,444 | B2 * | 12/2011 | Xiao et al. | 361/679.49 |
| 8,081,465 | B2 * | 12/2011 | Nishiura | 361/703 |
| 8,085,536 | B2 * | 12/2011 | Hsieh et al. | 361/695 |
| 8,189,331 | B2 * | 5/2012 | Senatori | 361/679.48 |
| 8,243,437 | B2 * | 8/2012 | Chou et al. | 361/679.49 |
| 8,254,111 | B2 * | 8/2012 | Wu et al. | 361/679.46 |
| 2009/0154090 | A1 * | 6/2009 | Su | 361/679.49 |
| 2011/0188200 | A1 * | 8/2011 | Takahashi et al. | 361/690 |

* cited by examiner

*Primary Examiner* — Boris Chervinsky
(74) *Attorney, Agent, or Firm* — Altis Law Group, Inc.

(57) ABSTRACT

A computer enclosure includes an enclosure, an air conduction member mounted in the enclosure to guide airflow, and a data storage device mounted to a top of the air conduction member.

14 Claims, 3 Drawing Sheets

COMPUTER ENCLOSURE

BACKGROUND

1. Technical Field

The disclosure relates to computer enclosures, and particularly to a computer enclosure configured for using the inner space effectively.

2. Description of Related Art

A bracket is often needed to be mounted in a computer enclosure, in which a storage device will be attached. However, it is common for a computer to house several storage devices, which leads to an increase in space and complexity of the computer.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
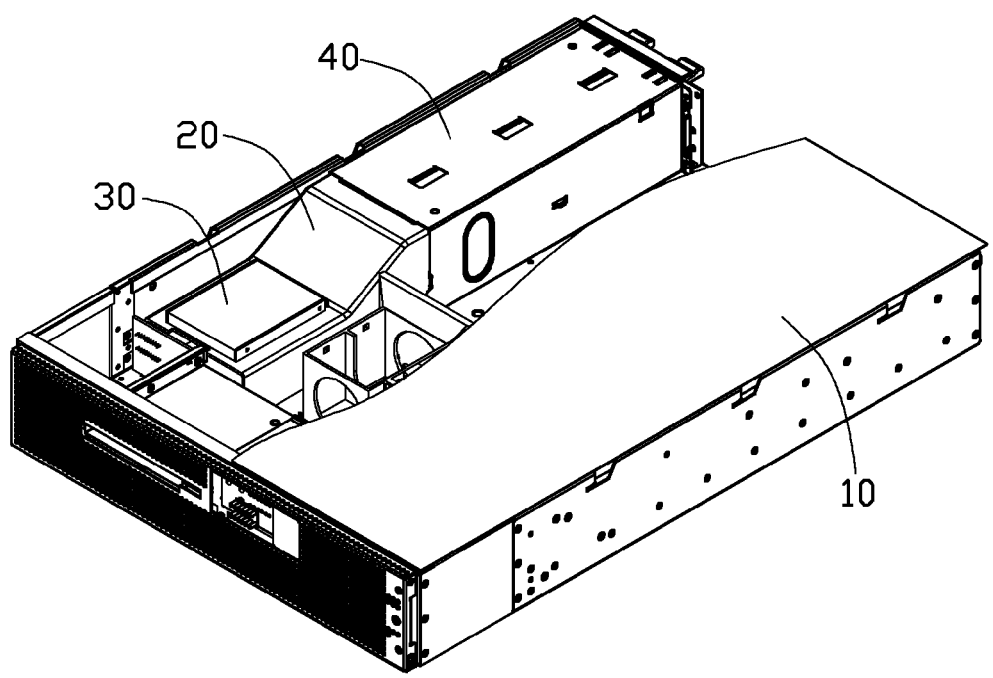
FIG. 1 is an assembled, isometric view of a computer enclosure, in accordance with an embodiment, the computer enclosure includes an air conduction member, and a data storage device mounted to the top of the air conduction member.
Figure 2:
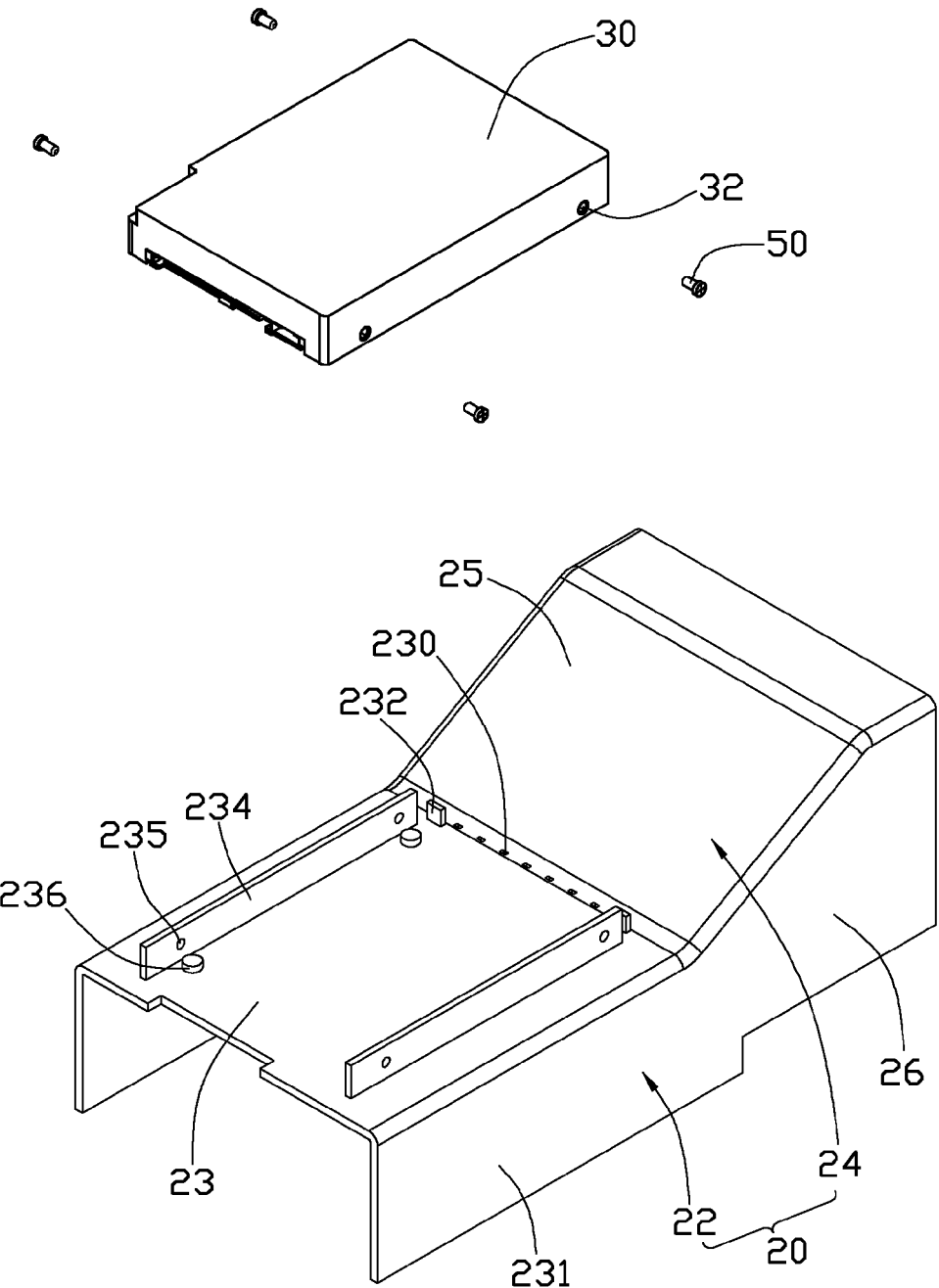
FIG. 2 is an exploded, isometric view of the air conduction member and the data storage device of FIG. 1.

Referring to FIGS. 1 and 2, a computer enclosure includes an enclosure 10, an air conduction member 20 mounted in the enclosure 10, a data storage device 30, a power supply module 40, and a plurality of fasteners 50. In this embodiment, the fasteners 50 are screws.

The air conduction member 20 includes a substantially U-shaped guide portion 22, and a vent portion 24 through which airflow flows. The guide portion 22 includes a flat top board 23, and two side boards 231 perpendicularly extending down from opposite sides of the top board 23. The vent portion 24 includes a slanted top plate 25 extending up from the top board 23, and two sidewalls 26 extending down from opposite sides of the top plate 25. The sidewalls 26 are correspondingly connected to the side boards 231. A plurality of vents 230 are defined in the conjunction of the top board 23 and the top plate 25. Two resistance blocks 232 protrude from the sides of the top board 23, adjacent to the vents 230. Two mount panels 234 perpendicularly extend up from the top board 23, adjacent and parallel to the side boards 231. Each mount panel 234 defines two through holes 235. The distance between the mount panels 234 is substantially equal to the width of the data storage device 30. Two support protrusions 236 protrude from each side of the top board 23, adjacent to an inner side of a corresponding mount panel 234.

The data storage device 30 includes two opposite sidewalls (not labeled) each defining two fixing holes 32.

Figure 3:
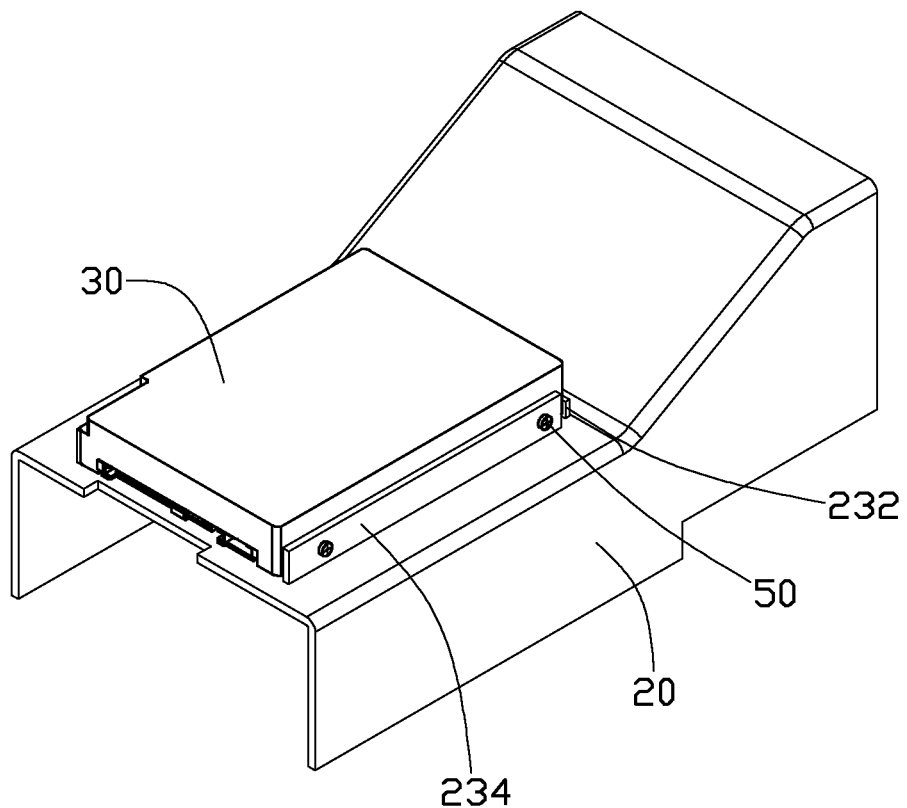
FIG. 3 is an assembled, isometric view of the air conduction member and the data storage device of FIG. 2.

Referring to FIG. 3, in assembly of the data storage device 30, the data storage device 30 is sandwiched between the mount panels 234 of the air conduction member 20. A bottom of the data storage device 30 is supported on the support protrusions 236 of the air conduction member 20, and the front end of the data storage device 30 resists against the resistance blocks 232. The fasteners 50 are extended through the through holes 235 of the mount panels 234, and then are screwed in the fixing holes 32 of the data storage device 30. Therefore, the data storage device 30 is mounted to the air conduction member 20. As a result, the enclosure 10 is not required to provide other space to accommodate the data storage device 30 and the arrangement of electronic units in the enclosure 10 needs no change, which saves space and cost of the enclosure 10.

Referring to FIG. 1 again, the air conduction member 20 is mounted to the enclosure 10, together with the date storage device 30. The vent portion 24 of the conduction member 20 is aligned with the power supply module 40, so that airflow from the conduction member 20 dissipates the power supply module 40. In addition, some airflow can pass through the vents of the air conduction member 20 to dissipate the heat from the data storage device 30.

It is believed that the present embodiment and its advantages will be understood from the foregoing description, and it will be apparent that various changes may be made thereto without departing from the spirit and scope of the description or sacrificing all of their material advantages, the example hereinbefore described merely being exemplary embodiment.

What is claimed is:

1. A computer enclosure comprising:
   an enclosure;
   an air conduction member mounted in the enclosure to guide airflow and comprising a guide portion, the guide portion comprising a top board; two mount panels extending from the top board; and
   a data storage device mounted on the top board of the air conduction member and sandwiched between the mount panels.

2. The computer enclosure of claim 1, further comprising a power supply module, wherein the air conduction member comprises a vent portion in alignment with the power supply module.

3. The computer enclosure of claim 2, wherein the guide portion connected to the vent portion opposite to the power supply module.

4. The computer enclosure of claim 1, wherein each mount panel defines two through holes, opposite sidewalls of the data storage device each define two fixing holes, fasteners are extended through the through holes, and then, engaged in the fixing holes.

5. The computer enclosure of claim 1, wherein the guide portion further comprises two side boards extending down from opposite sides of the top board.

6. The computer enclosure of claim 1, wherein two support protrusions protrude from the top board, adjacent to inner sides of the mount panels, a bottom of the data storage device is supported on the support protrusions.

7. The computer enclosure of claim 1, wherein the air conduction member further comprises a vent portion slantingly extending from the top board, a conjunction of the top board and the vent portion defines a plurality of vents.

8. The computer enclosure of claim 7, wherein two resistance blocks extend from the top board, adjacent to the plurality of vents, a front end of the data storage device resists against the resistance blocks.

9. The computer enclosure of claim 7, further comprising a power supply module mounted in the enclosure, wherein the vent portion is in alignment with the power supply module.

10. An assembly comprising:
an air conduction member for guiding airflow; and
a data storage device mounted on a top of the air conduction member;
wherein the air conduction member comprises a guide portion, the guide portion comprises a top board, and two side boards extending down from opposite sides of the top board, wherein the data storage device is mounted on the top board; and
wherein two mount panels extend from the top board, a distance between the mount panels is substantially equal to a width of the data storage device, the data storage device is sandwiched between the mount panels.

11. The assembly of claim 10, wherein the air conduction member further comprises a vent portion, the vent portion comprises a slanted top plate extending up from an end of the top board, and two sidewalls extending down from opposite sides of the top plate and connected to the side boards of the guide portion.

12. The assembly of claim 10, wherein each mount panel defines two through holes, opposite sidewalls of the data storage device each define two fixing holes, fasteners are extended through the through holes, and then, engaged in the fixing holes.

13. An assembly comprising:
a computer enclosure;
an air conduction member accommodated in the computer enclosure for guiding airflow and comprising a guide portion and a vent portion; the guide portion comprising a flat top board, and two side boards extending down from opposite sides of the top board, the vent portion comprising a slanted top plate extending up from an end of the top board, and two sidewalls extending down from opposite sides of the top plate and connected to the side boards of the guide portion; and
a data storage device mounted onto the top board.

14. The assembly of claim 13, wherein a plurality of support protrusions extends up from the top board to support and space a bottom of the data storage device from the top board.

* * * * *